United States Patent [19]
Simon

[11] Patent Number: 6,061,792
[45] Date of Patent: May 9, 2000

[54] SYSTEM AND METHOD FOR FAIR EXCHANGE OF TIME-INDEPENDENT INFORMATION GOODS OVER A NETWORK

[75] Inventor: Daniel R. Simon, Redmond, Wash.

[73] Assignee: Microsoft Corporation, Redmond, Wash.

[21] Appl. No.: 08/829,989

[22] Filed: Apr. 1, 1997

[51] Int. Cl.[7] .................................................. H04L 9/00
[52] U.S. Cl. ............................................. 713/176; 705/76
[58] Field of Search ........................... 380/21, 212, 229; 705/25, 26, 37, 35, 1, 44, 27, 64, 80, 76; 713/176

[56] References Cited

U.S. PATENT DOCUMENTS

| | | | |
|---|---|---|---|
| 5,671,279 | 9/1997 | Elgamal | 380/23 |
| 5,710,887 | 1/1998 | Chelliah | 395/226 |
| 5,794,207 | 8/1998 | Walker | 705/23 |
| 5,809,144 | 9/1998 | Sirbu | 380/25 |
| 5,850,442 | 12/1998 | Muftic | 380/21 |

*Primary Examiner*—Tod R. Swann
*Assistant Examiner*—Todd Jack
*Attorney, Agent, or Firm*—Lee & Hayes, PLLC

[57] ABSTRACT

A system and method facilitates a fair exchange of time-independent information goods between a first party's computer and a second party's computer over a network, such as the Internet. The first party's computer creates a digital contract proposal concerning the exchange of information goods. The first party's computer digitally signs the contract proposal and stipulates a condition which, when satisfied by the second party, will create a valid contract. The first party's computer then transmits the signed contract proposal over the network to the second party's computer. The second party has one of two options: (1) satisfy the condition in the contract proposal to create a valid contract and return the valid contract to the first party, or (2) store the signed contract proposal without satisfying the condition and supply the information goods to the first party. Upon receipt of the contract or goods from the second party, the first party's computer supplies its information goods to the second party's computer. In the event that either party reneges, the non-reneging party can produce the valid contract and submit it to an adjudicator for enforcement and remedy.

36 Claims, 2 Drawing Sheets

SYSTEM AND METHOD FOR FAIR EXCHANGE OF TIME-INDEPENDENT INFORMATION GOODS OVER A NETWORK

TECHNICAL FIELD

This invention relates to systems and methods for exchanging information goods over a network. More particularly, this invention relates to computer-implemented techniques for ensuring a fair exchange of time-independent information goods in which delivery of such goods is not time-critical.

BACKGROUND OF THE INVENTION

With the advent of ubiquitous electronic commerce over the Internet, much attention has been paid to the problem of "fair exchange" of information goods over remote communication channels. During an exchange over the Internet, information goods-such as electronic cash, digital signatures on promissory documents, computer application programs, data, and the like-are typically transmitted between two remote parties who have essentially no knowledge of each other. The problem of "fair exchange" involves ensuring that the parties truly exchange the information goods for which they have previously bargained. The problem involves issues such as who sends their goods first, and how can a party be assured that once they send their goods, the other party will abide by the agreement and send its goods back in return.

In conventional, face-to-face business transactions involving concrete goods, the fair exchange problem is solved by social mechanisms. For example, a customer who is purchasing an item from a merchant initiates a purchase by laying money (e.g., cash, check, credit card, etc.) down on the store counter. The merchant hands over the item and collects the cash to complete the transaction. If, for some reason, the merchant decides to depart from this social exchange protocol and take the money without giving the item in return, the customer has several avenues of recourse, including acting disruptively in the store, informing other patrons that the merchant is acting unscrupulously, or summoning a police official. Similarly, if the customer acts illegally and attempts to take the item without payment, the merchant can summon in-store security personnel or a police official for prompt remedy.

In a remote environment such as the Internet, there is no physical transaction between face-to-face parties. It may be impossible to identify either party, or to establish that a party actually received what the other party claimed to have sent. There are no Internet police to summon. Indeed, most of the social conventions that are used in point-of-purchase exchanges are utterly worthless in Internet commerce.

For commerce to succeed over the Internet, the fair exchange problem needs to be solved. One traditional solution is to involve a third party as a facilitator to the transaction. Both parties send their information goods through the third party, who mediates the exchange. For example, most commerce over the Internet today is in the form of credit card transactions, in which customer banks and merchant banks are brought together by the credit card company under a complex agreement that determines who will bear the cost if one of the parties to the transaction reneges. In effect, the banks, under the credit card's aegis, mediate the entire transaction, using their previous traditional relationships with customers and merchants to assign liability in the event of disputes.

The drawback with employing a third party facilitator is that such mediation is expensive. Moreover, a third party sufficiently trusted by both parties to mediate the entire transaction (including possibly the exchange of secret information) might not be available. It is therefore desirable to avoid use of exchange intermediaries.

Another prior art solution to the fair exchange problem is to use a gradual exchange protocol. The parties divide their respective information goods into sub-units and slowly exchange individual sub-units. Each party gradually receives the other party's sub-units and reconstructs the information goods, piece-by-piece. If one party reneges, the other party stops sending the remaining sub-units and hopefully, the reneging party is unable to glean any value from the sub-units that have already been sent.

The gradual exchange protocol has a drawback in that it is computationally expensive to divide the goods, transmit them in piecemeal fashion, receive the sub-units from the other party, and reconstruct the other party's goods from the received sub-units. Another drawback with this approach is that one of the goods might become valuable more quickly. That is, upon the exchange of the $n^{th}$ sub-unit, one party may have something of value while the other party does not. This can present a problem.

Accordingly, there remains a need for a fair exchange protocol that safeguards the parties' interests without introducing costly third parties or expensive exchange techniques.

SUMMARY OF THE INVENTION

This invention concerns a system and method for facilitating a fair exchange of information goods between a first party and a second party over a network, such as the Internet. The system and method are particularly directed to information goods which are not time dependent, meaning that they can be exchanged at any time without loss of value.

According to one aspect of this invention, one party creates a digital contract proposal concerning the exchange of information goods. The party digitally signs the contract proposal and stipulates a condition which, when satisfied by the second party, will create a valid contract. The first party then transmits the signed contract proposal over the network to the second party. The second party then has one of two options: (1) satisfy the condition in the contract proposal to create a valid contract and return the valid contract to the first party, or (2) store the signed contract proposal without satisfying the condition and supply the information goods to the first party. Upon receipt of the contract or goods from the second party, the first party supplies its information goods to the second party.

In the event that either party reneges, the non-reneging party can produce the valid contract. If the non-reneging party is the second party who has not yet satisfied the condition, the second party can retrieve the stored contract proposal, satisfy the condition, and then produce the valid contract. The non-reneging party submits the valid contract to an adjudicator for enforcement and remedy. If appropriate, the adjudicator can require one or both parties to resend their information goods in fulfillment of the contract.

According to another aspect, the contract proposal contains hash values of definitions for the goods to be exchanged. The hash values uniquely identify the goods definitions so that both parties can specifically determine which goods are involved in the transaction.

According to still another aspect, at least some of the contract proposal is hashed to yield a hash value. This hash value uniquely identifies the contract proposal. In this manner, the condition contained in the contract proposal can be stipulated as pertaining to the contract proposal having the specific hash value to ensure that both parties are agreeing to the same document.

These and other aspects are described more fully below.

DETAILED DESCRIPTION OF THE PREFERRED EMBODIMENT

The following discussion assumes that the reader is familiar with cryptography. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Figure 1:
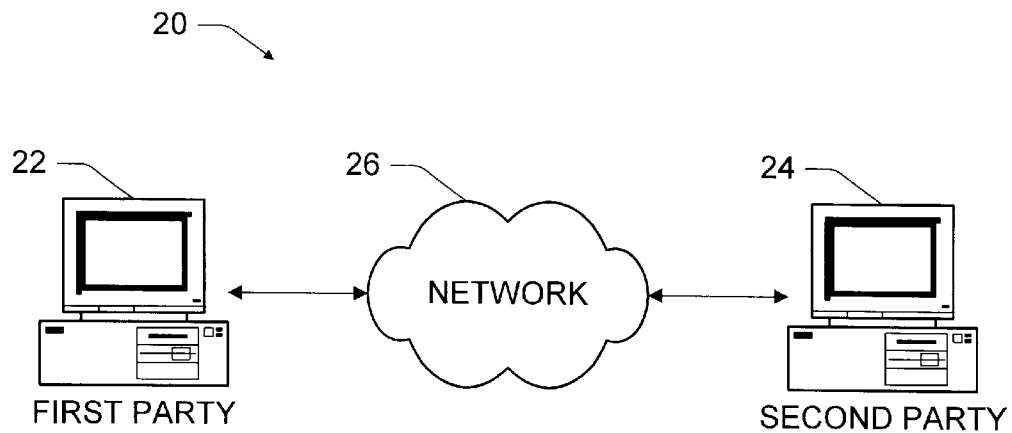
FIG. 1 is a diagrammatic illustration of an electronic commerce system involving an exchange of information goods between two computing units over a network.

FIG. 1 shows an electronic commerce system 20 having a first computing unit 22 and a second computing unit 24 interconnected via a network 26. The system 20 is representative of an Internet commerce system in which Internet users exchange information goods over the Internet. For example, the first computing unit 22 is resident at a first party (e.g., a consumer) and the second computing unit 24 is resident at a second party (e.g., a merchant). The first and second computing units are implemented with modems or network cards, which facilitate access (direct or otherwise) to the Internet so that the first and second parties can exchange information goods over the Internet.

"Information goods" are goods that can exist in electronic form and can be transmitted over a network. Information goods include such items of value as electronic cash, digital signatures on promissory documents, payment instructions, electronic checks, computer application programs, video files, audio files, multimedia files, and other forms of data. Information goods can be classified as one of two type: time-independent goods and time-dependent goods. Time-independent goods are goods which are not time critical and may be delayed in sending or receiving without harm to the sender or receiver. In contrast, time-dependent goods (e.g., stock quotes, electronic financial instruments with expiration dates, etc.) require prompt delivery and timely arrival. Any delay in time-dependent goods renders the goods valueless. Aspects of this invention are primarily directed to the first class of information goods, which are not time critical.

Figure 2:
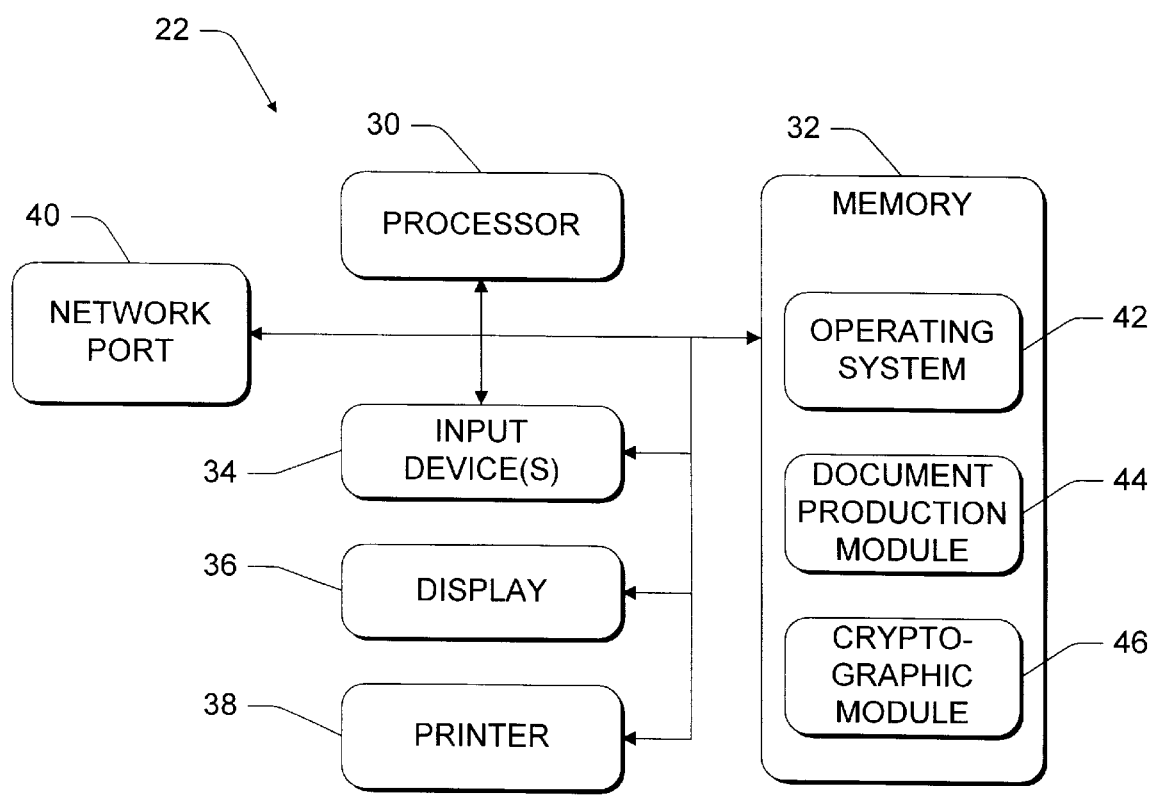
FIG. 2 is a block diagram of a computing unit.

FIG. 2 shows the first computing unit 22 in more detail. It includes a processor 30, memory 32 (RAM, ROM, flash, floppy disk, hard disk, CD-ROM, etc.), one or more input devices 34 (e.g., keyboard, mouse, track ball, touch panel screen, etc.), a display 36 (e.g., VGA monitor, LCD screen, etc.), and an optional printer 38. The computing unit 22 also has a network port 40 which facilitates access to the network 26. The network port 40 may be implemented as a modem, network card, or other device which interfaces the computer to the network.

The computing unit 22 can be implemented as a common personal computer, or other type of computer, such as a laptop computer, a notebook computer, a palm top computer, or the like. The computing unit 22 runs an operating system 42 which is stored in memory 32 and executes on processor 30. The operating system 42 is preferably a multitasking, disk-based operating system, such as a Windows® brand operating system from Microsoft Corporation (e.g., Windows® 95, Windows® NT, Windows® CE, or other derivative of Windows®). However, other operating systems may be used.

The computing unit 22 has a document production module 44 implemented in software stored in memory 32 and executable on the processor 30. The document production module 44 is used to create a contract proposal describing terms for exchanging the information goods between the two parties. The document production module 44 may be implemented in a number of ways, including as a word processor, an e-mail program, or any other computer application which can create meaningful terms in human readable, or machine readable language, that can be understood and agreed to by the parties.

The computing unit 22 also has a cryptographic module 46 implemented in software stored in memory 32 and executable on the processor 30. The cryptographic module 46 performs such tasks as encryption, decryption, digital signing, authentication, and hash computations.

The second computing unit 24 is not described in detail. For discussion purposes, however, assume that the second computing unit 24 is implemented in essentially the same manner as the first computing unit 22.

Now, suppose that the first and second parties desire to exchange information goods over the network 26. For purposes of continuing discussion, consider an example in which the first party (a consumer) desires to purchase a computer program from the second party (a merchant) using some form of electronic money.

Figure 3:
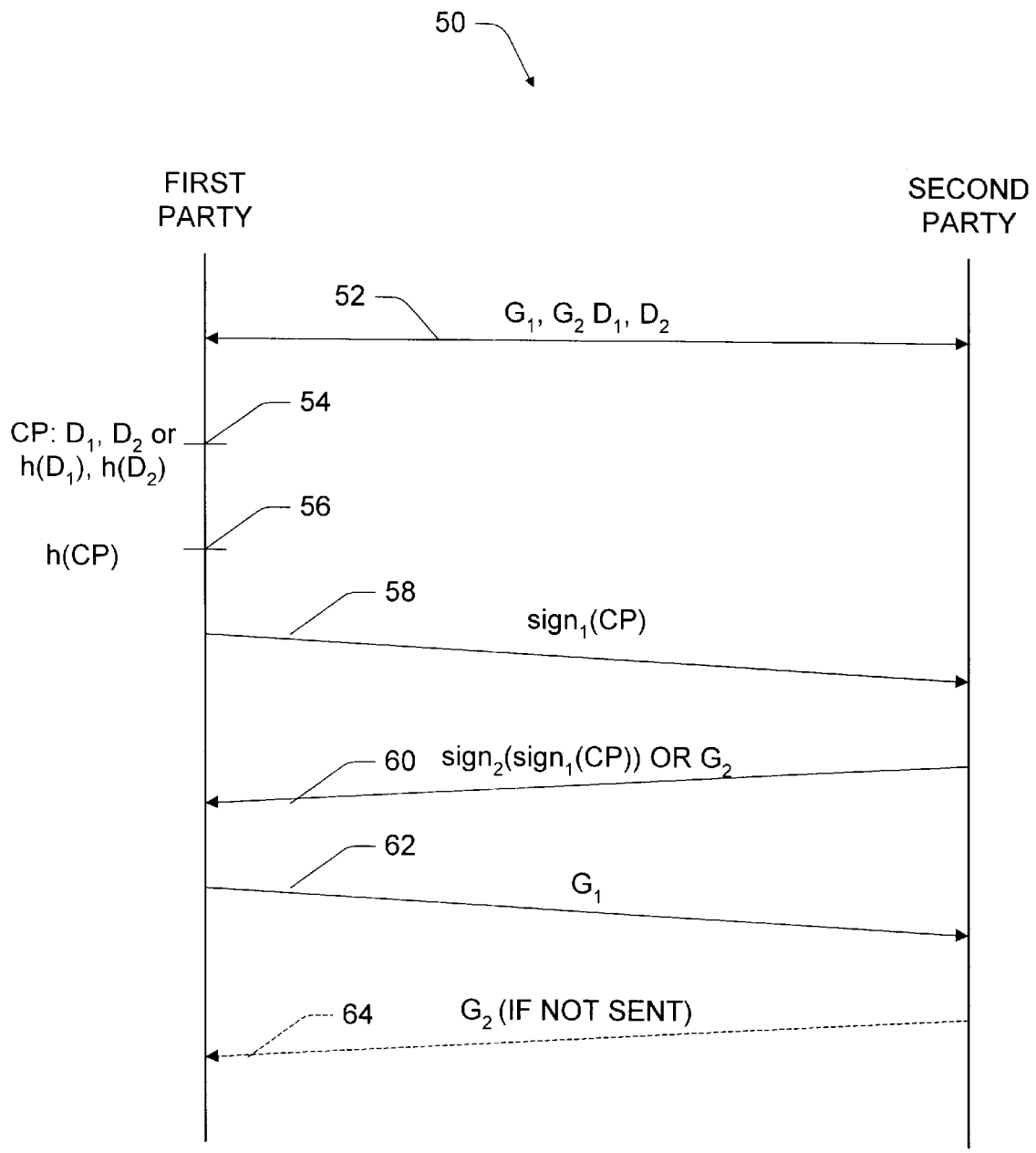
FIG. 3 is a sequence diagram illustrating a method for fair exchange of information goods.

FIG. 3 shows a computer-implemented method 50 for fair exchange of the information goods over the network 26 between the first and second parties. The fair exchange protocol is described with continuing reference to FIGS. 1 and 2, and to the example involving the computer program-for-money exchange.

At step 52 in FIG. 3, the first and second parties undergo some preliminary negotiations for the exchange of information goods. These negotiations may be formal, but are most likely informal, and are entirely non-binding from a legal standpoint. In our example, the negotiation may be as simple as the consumer hitting on the merchant's Web site and deciding to purchase the computer program introduced at that Web site. Through this preliminary negotiation phase, the consumer derives independently, or with the assistance of the merchant, a definition $D_1$ of the goods $G_1$ (i.e., electronic money) that he/she intends to send to the merchant, and a definition $D_2$ of the goods $G_2$ (i.e., computer program) that the merchant intends to send to the consumer in exchange for $G_1$.

At step 54 in FIG. 3, the first computing unit 22 uses the document production module 44 to create a contract proposal CP which proposes an exchange of the goods. The contract proposal CP includes the definition $D_1$ of the goods $G_1$, a definition $D_2$ of the goods $G_2$, and terms for an exchange of the goods $G_1$ and $G_2$. The contract proposal CP is drafted with the intent that the proposal remain non-binding until it is converted to a full valid contract which is legally enforceable. The contract proposal CP can be drafted in many different ways, and two example approaches are discussed herein. Briefly, the two example types of contract proposals are an integrated statement and a two-part document containing an offer portion and an acceptance portion.

With the integrated statement approach, the consumer uses the document production module 44 to create a simple contract statement. For instance, the contract statement might be as follows:

I promise to send $xxx.xx to the merchant in exchange for receiving the computer program ABC from the merchant.

Notice that the statement includes identification of the consumer's goods $G_1$ (i.e., $xxx.xx), identification of the merchant's goods $G_2$ (i.e., computer program ABC), and the general terms (i.e., promise to exchange). To uniquely ensure that the goods $G_1$ and $G_2$ are properly identified, the contract statement may be configured to include the specific definitions $D_1$ and $D_2$, as follows:

I promise to send $D_1$ to the merchant in exchange for receiving $D_2$ from the merchant.

Definitions are particularly useful for complex goods which may not be easily identifiable in terms of a serial number, or product name.

A more concise technique to ensure that the goods are uniquely identified is to compute hash values $h(D_1)$ and $h(D_2)$ of the definitions $D_1$ and $D_2$ and include the hash values in the contract proposal A hash function is a mathematical function that converts an input data stream into a fixed-size, often-smaller, output data stream that is representative of the input data stream. Hash values do not uniquely identify the large data streams, but it is assumed to be difficult to find two data streams which produce the same hash value; hence their effect is as if they were unique identifiers. The hash function is also deterministic in that two identical definitions passed through the same hash function will result in the same hash value. Accordingly, rather than inserting the full definitions into the contract proposal, the hash values may be substituted for the full definitions since the hash values uniquely and unambiguously represent the full definitions.

The computer passes the definitions $D_1$ and $D_2$ to the cryptographic module 46, which computes and returns the hash values $h(D_1)$ and $h(D_2)$ of the definitions $D_1$ and $D_2$. The contract statement can thus be restated with hash values as follows:

I promise to send goods whose definition has the hash value $h(D_1)$ to the merchant in exchange for receiving goods whose definition has the hash value $h(D_2)$ from the merchant.

Finally, the definitions $D_1$ and $D_2$ may themselves include values $h(G_1)$ and $h(G_2)$, thus exactly specifying both the specific goods and their description (so that the accuracy of the description can be assessed later).

In addition to the basic contract statement, the contract proposal stipulates a condition which, upon satisfaction by the merchant, will create a valid contract. In this example, the condition is that the contract becomes valid only when both parties have digitally signed the contract proposal.

Next, consider the two-part document approach to drafting the contract proposal. The document production module 44 is invoked to create a contract proposal having an offer portion and an acceptance portion. For instance, the same exchange might be drafted as follows:

I promise to send goods whose definition has the hash value $h(D_1)$ to the merchant. [Offer Portion]

I promise to send goods whose definition has the hash value $h(D_2)$ to the consumer. [Acceptance Portion]

The consumer signs the offer portion and includes a condition explicitly stating that a valid contract will be created only if the merchant digitally signs the acceptance portion.

To ensure that the merchant is agreeing to the same contract proposal originated by the consumer, the consumer's computing unit 22 uses the cryptographic module 46 to compute a hash value $h(CP)$ of at least some of the contract proposal CP (step 56 in FIG. 3). For the integrated approach, the computer 22 hashes the entire statement. For the two-part contract proposal, the computer 22 hashes the acceptance portion AP to form a hash value $h(AP)$.

At step 58, the consumer's computer 22 digitally signs the contract proposal using a digital signature unique to the consumer. One technique for forming this digital signature is to encrypt the hash value $h(CP)$ of the contract proposal using a private signing key from an asymmetric public/private key pair which is unique to the consumer. The public/private keys form the foundation of public cryptography systems. The keys are based upon a mathematical relationship in which one key cannot be calculated (at least in any reasonable amount of time) from the other key. The public key is distributed to other parties and the private key is maintained in confidence by the holder. Public key cryptography is well known with an example asymmetric cipher being the well-known RSA cryptographic algorithm named for the creators Rivest, Shamir, and Adleman.

For the integrated approach to drafting contract proposals, the computer 22 digitally signs the entire contract statement (i.e., essentially the entire contract proposal). The condition is then attached as a rider to the signed contract proposal which stipulates that the contract becomes valid only when the merchant digitally signs the identical contract proposal having a hash value $h(CP)$. Accordingly, the final draft of the integrated contract proposal is as follows:

I promise to send goods whose definition has the hash value $h(D_1)$ to the merchant in exchange for receiving goods whose definition has the hash value $h(D_2)$ from the merchant.

Consumer Signature

Condition: This contract proposal becomes a valid contract if, and only if, the merchant digitally signs the contract proposal having a hash value $h(CP)$.

For the two-part document approach to drafting contract proposals, the computer 22 digitally signs the offer portion, but not the acceptance portion. The condition then stipulates that the contract becomes valid only when the merchant digitally signs the identical acceptance portion having a hash value $h(CP)$. Accordingly, the final draft of the two-part contract proposal is as follows:

I promise to send goods whose definition has the hash value $h(D_1)$ to the merchant.

Consumer Signature

I promise to send goods whose definition has the hash value $h(D_2)$ to the consumer.

Condition: This contract proposal becomes a valid contract if, and only if, the merchant digitally signs the acceptance portion having a hash value $h(AP)$.

The conditions can, of course, be stated differently. For instance, the same condition might be restated in the negative as "This contract proposal is non-binding unless, and until, the merchant digitally signs the acceptance portion having a hash value $h(AP)$."

At step 58 in FIG. 3, the consumer's computer 22 transmits a message carrying the signed contract proposal CP (i.e., $\text{sign}_1(CP)$) over the network 26 to the second party. The consumer's computer may or may not encrypt and sign the message. The merchant's computer 24 receives the message, and if encrypted, decrypts the message and authenticates the message signature.

At this point, the merchant has two options. One option is to satisfy the condition in the signed contract proposal to create the valid contract. In the above example, the condition is satisfied when the merchant computer 24 digitally signs the contract proposal CP having a hash value h(CP), in the case of the integrated draft, or digitally signs the acceptance provision AP having the hash value h(AP), in the case of the two-part draft. The merchant computing unit stores a copy of the valid contract and returns the valid contract (i.e., $sign_2$ ($sign_1$(CP))) to the first computing unit, where it is also stored (step 60 in FIG. 3).

At step 62 in FIG. 3, the consumer transmits goods $G_1$ identified in the definition $D_1$ (i.e., the electronic money) to the merchant to fulfill the contract obligation. Upon receipt of the goods $G_1$, the merchant transmits goods $G_2$ identified in the definition $D_2$ (i.e., the computer program) to the consumer to fulfill the contract obligation (step 64).

In the event that either party fails to perform their obligations in the contract, the other party can produce the valid contract (e.g., printing out a hard Copy on printer 38) and take the contract to an adjudicator for enforcement. Since the information goods are time-independent, the after-the-fact adjudicator can apply a remedy of requiring one or both parties to resend the promised goods.

A second option available to the merchant upon receiving the signed contract proposal at step 58 is to store the signed contract proposal without satisfying the condition and supply the goods $G_2$ identified in the definition $D_2$ (i.e., the computer program) to the consumer (step 60 in FIG. 3). The merchant can satisfy the condition at any time, and already has the signature of the consumer obligating the consumer to supply the goods $G_1$ identified in the definition $D_1$ (i.e., the electronic money) in return for the goods $G_2$.

Upon receipt of the goods $G_2$, the consumer transmits goods $G_1$ identified in the definition $D_1$ to the merchant to fulfill the contract obligation (step 62). In this second option, step 64 is not utilized.

If, for some reason, the consumer reneges after receiving the computer program from the merchant and does not send the electronic money as promised, the merchant retrieves the signed contract proposal from storage and satisfies the condition. The merchant can then produce the valid contract to the adjudicator for proper recourse. Because the goods being exchanged are assumed to be time-independent, the adjudicator need not concern himself/herself with whether a complaint by one party that the other has reneged on the contract is a valid complaint. As long as the contract itself is valid, the adjudicator can simply require that the accused party comply with it by sending its promised goods. If that party has in fact already complied, then he loses nothing (and the other party gains nothing) by his sending exactly the same goods a second time.

It is noted that the merchant may alternatively initiate the protocol by creating and submitting a contract proposal to the consumer.

The invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A computer-implemented method for facilitating exchange of information goods over a network, the method comprising:

creating a contract proposal at the first party concerning an exchange of information goods;

digitally signing the contract proposal using a digital signature unique to the first party to create a signed contract proposal, the signed contract proposal stipulating a condition which, upon satisfaction by the second party, will create a valid contract without requiring participation of a third party; and transmitting te signed contact proposal to the second part.

2. A computer-implemented method as recited in claim 1, wherein the signed contract proposal stipulates a condition that the contract becomes valid only upon the second party digitally signing the contract proposal.

3. A computer-implemented method as recited in claim 1, wherein:

the step of creating a contract proposal comprises the step of creating an offer portion and an acceptance portion which include a definition of first goods to be provided by the first party, a definition of second goods to be provided by the second party, and terms for an exchange of the first and second goods; and the step of digitally signing comprises the step of digitally signing the offer portion and stipulating a condition that the valid contract will be created if the second party digitally signs the acceptance portion.

4. A computer-implemented method as recited in claim 1, further comprising the step of satisfying the condition in the signed contract proposal, at the second party, to create the valid contract.

5. A computer-implemented method as recited in claim 4, further comprising the step of exchanging the information goods between the first and second parties.

6. A computer-implemented method as recited in claim 4, further comprising the step of producing the contract for dispute resolution in an event that either of the first party or the second party fails to perform the contract.

7. A computer-implemented method as recited in claim 1, further comprising the following steps:

storing the signed contract proposal offer at the second party; and supplying the information goods specified in the signed contract proposal from the second party to the first party.

8. A computer-implemented method as recited in claim 7, further comprising the following steps:

satisfying the condition in the signed contract proposal, at the second party, to create the valid contract; and producing the contract for dispute resolution.

9. A computer-readable medium having computer-executable instructions for performing the steps in the computer-implemented method as recited in claim 1.

10. A computer programmed to perform the steps in the computer-implemented method as recited in claim 1.

11. A computer-implemented method for facilitating exchange of information goods over a network between a first party and a second party, comprising:

creating a contract proposal at the first party, the contract proposal containing an offer portion and an acceptance portion which include a definition of first goods to be provided by the first party, a definition of second goods to be provided by the second party, and terms for an exchange of the first and second goods;

computing a hash value of the acceptance portion of the contract proposal;

digitally signing the offer portion of the contract proposal using a digital signature unique to the first party to create a signed offer, the signed offer specifying that a valid contract will be created only if the second party signs the identical acceptance portion which computes to the hash value using a digital signature unique to the second party; and transmitting the contract proposal with the signed offer and acceptance portion directly to the second party without requiring participation by any party other than the first party and the second party.

12. A computer-implemented method as recited in claim 11, further comprising the following steps:

computing hash values of the definition of the first goods and the definition of the second goods; and including the hash values of the definitions in the offer portion.

13. A computer-implemented method as recited in claim 11, further comprising the step of digitally signing the acceptance portion which computes to the hash value using the digital signature unique to the second party to form the valid contract.

14. A computer-implemented method as recited in claim 13, further comprising the step of returning the valid contract to the first party.

15. A computer-implemented method as recited in claim 14, further comprising the step of producing the contract for dispute resolution in an event that either of the first party or the second party fails to perform the contract.

16. A computer-implemented method as recited in claim 13, further comprising the following steps:

providing the second goods from the second party to the first party; and thereafter, providing the first goods from the first party to the second party.

17. A computer-implemented method as recited in claim 11, further comprising the following steps:

receiving the contract proposal at the second party; and providing the second goods from the second party to the first party.

18. A computer-implemented method as recited in claim 17, further comprising the step of providing the first goods from the first party to the second party after the first party receives the second goods from the second party.

19. A computer-implemented method as recited in claim 17, further comprising the following steps:

digitally signing the acceptance provision which computes to the hash value using the digital signature unique to the second party to form the valid contract; and producing the contract for dispute resolution.

20. A computer-readable medium having computer-executable instructions for performing the steps in the computer-implemented method as recited in claim 11.

21. A computer programmed to perform the steps in the computer-implemented method as recited in claim 11.

22. A computer-implemented method for fair exchange of information goods over a network between a first party and a second party, the first party having first goods described in a definition $D_1$ and the second party having second goods described in a definition $D_2$, the computer-implemented method comprising the following steps:

computing a first hash value $h(D_1)$ of the definition $D_1$ of the first goods;

computing a second hash value $h(D_2)$ of the definition $D_2$ of the second goods;

creating a contract proposal CP at the first party containing terms for an exchange and the hash values $h(D_1)$ and $h(D_2)$ to uniquely identify the first and second goods;

computing a third hash value $h(CP)$ of the contract proposal CP;

digitally signing the contract proposal CP using a digital signature unique to the first party;

including as party of the signed contract proposal explicit terms indicating that the second party will create a valid contract upon the second party digitally signing the contract proposal CP which has the identical third hash value $h(CP)$;

transmitting the signed contract proposal to the second party;

receiving the signed contract proposal at the second party; and performing, at the second party, one of the following steps: (1) digitally signing the contract proposal CP which has the identical third hash value $h(CP)$ using a digital signature unique to the second party to create a valid contract and returning the valid contract to the first party, or (2) storing the signed contract proposal without signing the contract proposal and supplying the second goods identified in the definition $D_2$ to the first party.

23. A computer-implemented method as recited in claim 22, wherein the digitally signing step to create the first party's signature comprises the step of encrypting the third hash value $h(CP)$ with a private key unique to the first party to create a digital signature for the contract proposal.

24. A computer-implemented method as recited in claim 22, further comprising the step of producing the valid contract for dispute resolution in an event that either of the first party or the second party fails to perform the contract.

25. Computer-readable media distributed at the first and second parties having computer-executable instructions for performing the steps in the computer-implemented method as recited in claim 22.

26. A computer-implemented method for fair exchange of information goods over a network between a first party and a second party, the first party having first goods descried in a definition $D_1$ and the second party having second goods described in a definition $D_2$, the computer-implemented method comprising:

(a) computing a first hash value $h(D_1)$ of the definition $D_1$ of the first goods;

(b) computing a second hash value $h(D_2)$ of the definition $D_2$ of the second goods;

(c) creating a two-part contact proposal CP at the first party containing terms for the exchange of the first and second goods, the contract proposal containing an offer portion OP to be signed by the first party and an acceptance portion AP to be signed by the second party, whereupon both signatures the contract proposal becomes a valid contract;

(d) including in the proposal portion and the acceptance portion the hash values $h(D_1)$ and $h(D_2)$ to uniquely identify the first and second goods;

(e) computing a third hash value $h(AP)$ of the acceptance portion AP of the contact proposal CP;

(f) digitally signing the offer portion OP of the contract proposal CP using a digital signature unique to the first party;

(g) including as party of the signed offer portion explicit terms indicating that contract proposal will become a valid contract upon the second party digitally signing the acceptance portion AP which has the identical third hash value $h(AP)$;

(h) transmitting the contract proposal CP with the signed offer portion to the second party;

(i) receiving the contract proposal CP and signed offer portion at the second party;

(j) performing, at the second party, one of the following steps: (1) digitally signing the acceptance portion AP of the contract proposal CP which has the identical third hash value h(AP) using a digital signature unique to the second party to create a valid contract and returning the valid contract to the first party, or (2) storing the contract proposal with signed offer portion without signing the acceptance portion and supplying the second goods identified in the definition $D_2$ to the first party;

wherein steps a–j are performed between the first and second parties without participation by a third party.

27. A computer-implemented method as recited in claim 26, further comprising the step of producing the valid contract for dispute resolution in an event that either of the first party or the second party fails to perform the contract.

28. Computer-readable media distributed at the first and second parties having computer-executable instructions for performing the steps in the computer-implemented method as recited in claim 26.

29. A system for facilitating exchange of information goods over a network between two parties, comprising:

a first computing unit at a first party;

a second computing unit at a second party;

the first computing unit being programmed to create a contract proposal concerning an exchange of information goods, the first computing unit digitally signing the contract proposal on behalf of the first party to produce a signed contract proposal and stipulating a condition which, upon satisfaction by the second party, will create a valid contract, the first computing unit transmitting the signed contract proposal to the second computing unit;

the second computing Unit being programmed to receive the signed contract proposal and to perform one of the following two steps: (1) satisfy the condition to create a valid contract and transmit the valid contract to the first part, or (2) store the signed contract offer without satisfying the condition and transmit goods to be provided by the second party to the first computing unit;

wherein the exchange is conducted between the first party and the second party without participation by a third party.

30. A system as recited in claim 29, wherein the first computing unit is programmed to receive the valid contract from the second computing unit and, in response, to transmit goods to be provided by the first party to the second computing unit in compliance with the valid contract.

31. A system as recited in claim 29, wherein the first computing unit is programmed to receive the goods from the second computing unit and, in response, to transmit goods to be provided by the first party to the second computing unit in compliance with the valid contract.

32. A system as recited in claim 29, wherein the first computing unit is further programmed to compute hash values of definitions of the goods to be exchanged and to include the hash values of the definitions in the contract proposal.

33. A system as recited in claim 29, wherein the contract proposal contains an offer portion and an acceptance portion, the first computing unit digitally signs the offer portion and includes the condition stipulating that the second party will create a valid contract upon digitally signing the acceptance portion.

34. In a system for facilitating exchange of information goods over a network between a first computing unit associated with a first party and a second computing unit associated with a second party, computer-readable media resident at the first and second computing units having computer-executable instructions to perform the following steps:

creating a contract proposal at the first computing unit describing goods to be exchanged between the first and second parties;

digitally signing, at the first computing unit, the contract proposal using a digital signature unique to the first party to create a signed contract proposal, the signed contract proposal stipulating a condition that a valid contract will be created only upon inclusion of a digital signature unique to the second party;

transmitting the signed contract proposal to the second computing unit;

receiving the signed contract proposal at the second computing unit;

performing, at the second computing unit, one of the following two steps: (1) digitally singing the contract proposal with the second party's digital signature to create a valid contact and transmitting the valid contract to the first computing unit, or (2) storing the signed contract proposal and transmitting the information goods to the first computing unit; and restricting involvement in the transaction to the first party and the second party.

35. Computer-readable media as recited in claim 34, further comprising computer-readable instructions for performing the additional step of creating a contract proposal having an offer portion, which is digitally signed by the first party, and an acceptance portion to be signed by the second party to create a valid contract.

36. In a system for facilitating exchange of information goods over a network between a sending party and a recipient party without requiring action by a third party, a computing unit resident at the sending party, comprising:

a processor;

a document production module executing on the processor to create a contract proposal describing the information goods, the contract proposal stipulating a condition, which upon satisfaction by the recipient party without any intervention by a third party, will create a valid contract; and a cryptographic module executing on the processor to digitally sign the contact proposal on behalf of the sending party and to compute a hash value of at least a portion of the contract proposal to uniquely identify the contract proposal to be digitally signed by the recipient party as being identical to the contract proposal signed by the sending party.

* * * * *